United States Patent
Watanabe

(10) Patent No.: US 8,417,179 B2
(45) Date of Patent: Apr. 9, 2013

(54) RADIO BROADCAST RECEIVER

(75) Inventor: Kyota Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/002,667

(22) PCT Filed: Apr. 30, 2009

(86) PCT No.: PCT/JP2009/001962
§ 371 (c)(1),
(2), (4) Date: Jan. 5, 2011

(87) PCT Pub. No.: WO2010/023781
PCT Pub. Date: Mar. 4, 2010

(65) Prior Publication Data
US 2011/0110464 A1 May 12, 2011

(30) Foreign Application Priority Data
Aug. 29, 2008 (JP) ................... 2008-221419

(51) Int. Cl.
*H04H 40/00* (2008.01)

(52) U.S. Cl. .............. 455/3.06; 455/3.01; 455/3.02; 455/3.03; 455/3.04; 455/3.05

(58) Field of Classification Search ......... 455/3.01–3.06
See application file for complete search history.

(56) References Cited

U.S. PATENT DOCUMENTS
2002/0115418 A1 * 8/2002 Wildhagen ............... 455/133

FOREIGN PATENT DOCUMENTS
JP 2002-319873 A 10/2002

* cited by examiner

*Primary Examiner* — Fayyaz Alam
(74) *Attorney, Agent, or Firm* — Birch, Stewart, Kolasch & Birch, LLP

(57) ABSTRACT

A radio broadcast receiver includes a broadcast reception and reproduction unit 1 for outputting a digital sound when being able to receive a digital signal included in a terrestrial digital radio broadcast, and for outputting an analog sound when being unable to receive the digital signal, and a control unit 3 for determining the broadcast type of the digital terrestrial broadcast received by the broadcast reception and reproduction unit 1 to carry out variable control of a transition time required to switch from an output of the analog sound to an output of the digital sound according to the determined broadcast type.

6 Claims, 3 Drawing Sheets

RADIO BROADCAST RECEIVER

FIELD OF THE INVENTION

The present invention particularly relates to a radio broadcast receiver suitable for use in reception of an HD radio broadcast which is a terrestrial digital radio broadcast based on an IBOC (In-Band On-Channel) method.

BACKGROUND OF THE INVENTION

IBOC which the FCC (Federal Communications Commission: Federal Communications Commission) has approved as standards, and which is a broadcast system for HD radio put to practical use in the U.S. uses a hybrid method of transmitting a digital signal simultaneously with an existing AM (Amplitude Modulation)/FM signal (Frequency Modulation) analog broadcast using the frequency of the analog broadcast.

In the above-mentioned HD broadcast, the same sound is broadcast fundamentally as both an analog sound and a digital sound, and a radio broadcast receiver that receives the hybrid broadcast outputs the digital sound when being able to receive the digital signal, and outputs the analog sound when being unable to receive the digital signal.

In this HD broadcast, the analog signal is broadcast while being delayed with respect to the digital signal by a delay time which is assumed to occur in a digital broadcast signal processing decoder. Therefore, a relatively long transition time is set up for switching between the analog sound and the digital sound in such a way that no time lag occurs between them and the user does not have a feeling that something is abnormal due to the difference in frequency characteristics between them.

By the way, a conventional broadcast receiver having a delay means for detecting a time lag between an FM-modulated analog sound and a digital sound (e.g., DAB: Digital Audio Broadcasting) to compensate for this time lag has been proposed. This broadcast receiver carries out a process of reducing an audible distortion which occurs when switching between frequencies or between broadcast types so as not to make the user have a feeling that something is abnormal (for example, refer to patent reference 1).

RELATED ART DOCUMENT

Patent Reference

Patent reference 1: JP,2002-319873,A

By the way, there is a possibility that in the above-mentioned HD radio broadcast, a broadcast of only a digital signal for the purpose of increasing the volume of traffic of data (referred to as an all digital broadcast from here on) will start in the future. Also in this case, a radio broadcast receiver tunes in to the band of an analog broadcast first, like in the case of a typical hybrid broadcast, though it is not necessary to provide a transition time, as mentioned above, required to switch from an analog sound to a digital sound because any analog signal is not actually broadcast. If a long transition time is provided, this transition time causes the user discomfort because the interval during which noise between radio stations can mix continues for a long time.

Furthermore, in the HD radio broadcast, programs which attach importance to immediacy (real time), such as lives, include a broadcast program (referred to as a ball game mode) in which a time lag occurs between an analog sound and a digital sound without intentionally taking into consideration a delay occurring in the digital broadcast signal processing decoder. Also in this case, it is not necessary to provide a transition time required to switch from the analog sound to the digital sound, like in the case of the above-mentioned all digital broadcast.

However, because conventional radio broadcast receivers including the broadcast receiver disclosed by above-mentioned patent reference 1 do not take into consideration these broadcast types, and have a transition time set in the same way, the conventional radio broadcast receivers have a problem that noise mixes in the all digital broadcast, and, in the ball game mode, it becomes difficult for the audio signal to be heard during the transition time due to the time lag occurring between the analog sound and the digital sound.

The present invention is made in order to solve the above-mentioned problems, and it is therefore an object of the present invention to provide a radio broadcast receiver that controls a transition time according to the broadcast type of a received terrestrial digital radio broadcast including an HD radio broadcast so as to be able to provide a comfortable receiving environment for a user without making the user feel bad also at the time of switching between broadcast types.

SUMMARY OF THE INVENTION

In order to solve the above-mentioned problems, a radio broadcast receiver in accordance with the present invention includes: a broadcast reception and reproduction unit for outputting a digital sound when being able to receive a digital signal included in a terrestrial digital radio broadcast, and for outputting an analog sound when being unable to receive the above-mentioned digital signal; and a control unit for determining a broadcast type of the above-mentioned digital terrestrial broadcast received by the above-mentioned broadcast reception and reproduction unit to carry out variable control of a transition time required to perform sound mixture at a time of switching from an output of the above-mentioned analog sound to an output of the above-mentioned digital sound according to the above-mentioned determined broadcast type.

The radio broadcast receiver in accordance with the present invention controls the transition time according to the broadcast type of the received terrestrial digital radio broadcast including an HD radio broadcast so as to be able to provide a comfortable receiving environment for a user without making the user feel bad also at the time of switching between broadcast types.

EMBODIMENTS OF THE INVENTION

Hereafter, in order to explain this invention in greater detail, the preferred embodiments of the present invention will be described with reference to the accompanying drawings.

Embodiment 1

Figure 1:
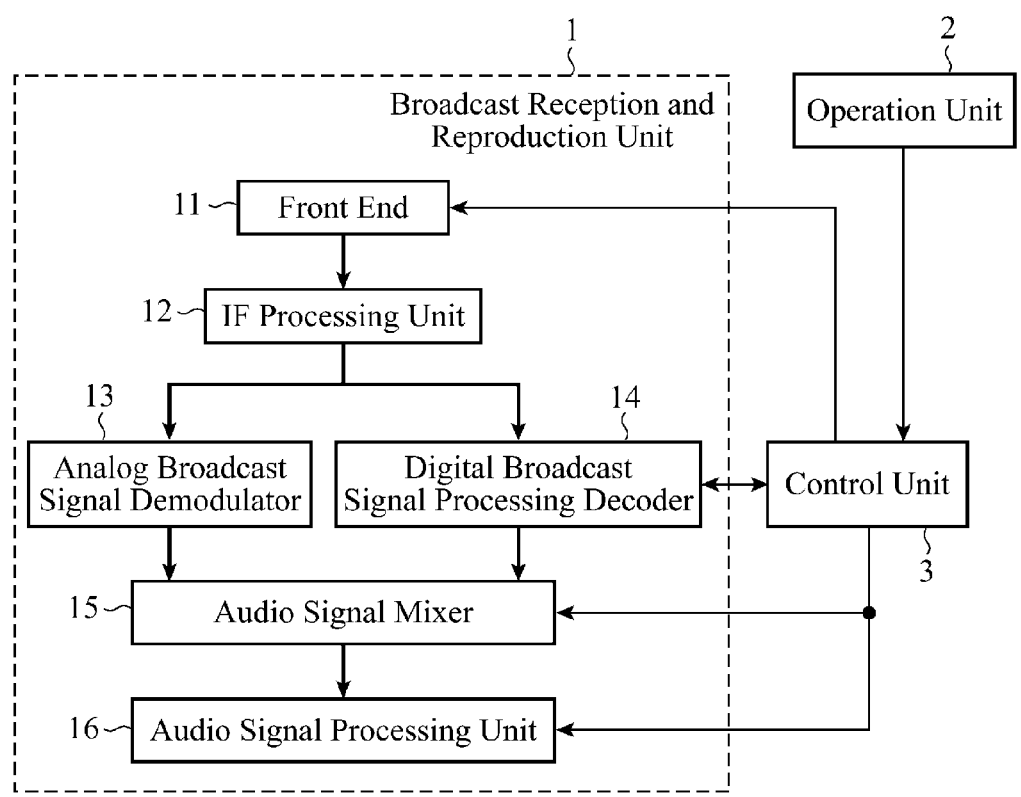
FIG. 1 is a block diagram showing the internal structure of a radio broadcast receiver in accordance with Embodiment 1 of the present invention.

FIG. 1 is a block diagram showing the internal structure of a radio broadcast receiver in accordance with Embodiment 1 of the present invention.

As shown in FIG. 1, the radio broadcast receiver in accordance with Embodiment 1 of the present invention is comprised of a broadcast reception and reproduction unit 1, an operation unit 2, and a control unit 3.

In this embodiment, the broadcast reception and reproduction unit 1 has a function of outputting a digital sound when being able to receive a digital signal included in an HD radio broadcast, and outputting an analog sound when being unable to receive the digital signal, and includes an front end 11, an IF (intermediate frequency) processing unit 12, an analog broadcast signal demodulator 13, a digital broadcast signal processing decoder 14, an audio signal mixer 15, and an audio signal processing unit 16.

In the broadcast reception and reproduction unit 1, the front end 11 performs high frequency amplification and frequency conversion on a received signal which has entered the radio broadcast receiver from a not-shown antenna, and the IF processing unit 12 divides the received signal into an analog broadcast signal and a digital broadcast signal. Then, the analog broadcast signal is outputted to the analog broadcast signal demodulator 13, while the digital broadcast signal is outputted to the digital broadcast signal processing decoder 14.

The digital broadcast signal processing decoder 14 is comprised of, for example, a DSP (Digital Signal Processor), decodes the received digital broadcast signal under program control, and outputs data included in this digital broadcast signal to the control unit 3 and also outputs an audio signal included in the digital broadcast signal to the audio signal mixer 15.

The audio signal mixer 15 processes an audio signal which is obtained by demodulating the analog broadcast signal (the audio signal is simply referred to as an analog sound from here on), and the audio signal which is obtained by decoding the digital broadcast signal (the audio signal is simply referred to as a digital sound from here on) in such a way that no time lag occurs between the analog sound and the digital sound and a feeling that something is abnormal due to the difference in the frequency characteristics between them does not occur. For example, the audio signal mixer attenuates the analog sound gradually and amplifies the digital sound gradually, and requires a relatively long transition time (for example, 5 to 6 seconds) to mix them into an audio signal. The audio signal mixer then outputs the audio signal to the audio signal processing unit 16.

The audio signal processing unit 16 performs processes including volume control and a frequency characteristic process on the audio signal according to a user's instruction which is inputted from the user operating the operation unit 2.

Figure 2:
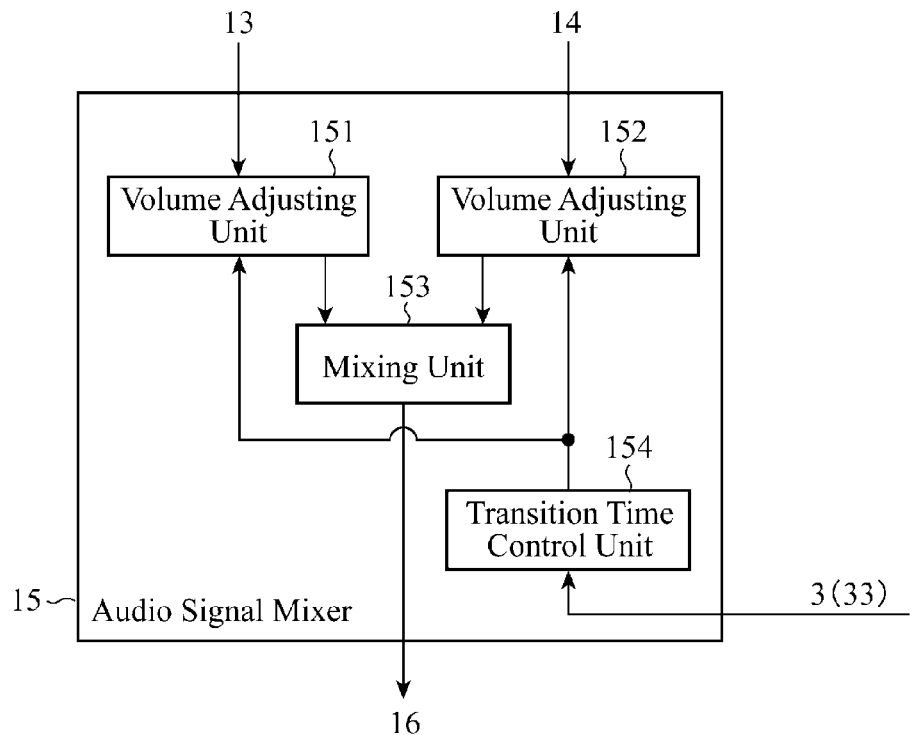
FIG. 2 is a block diagram showing the internal structure of an audio signal mixer of the radio broadcast receiver in accordance with Embodiment 1 of the present invention.

An example of the internal structure of the audio signal mixer 15 is shown in FIG. 2. As shown in FIG. 2, the audio signal mixer 15 is comprised of volume adjusting units 151 and 152 a mixing unit 153, and a transition time control unit 154.

When the transition time which can be varied and controlled by the control unit 3 is set to the transition time control unit 154, the audio signal mixer 15 adjusts the volume of the reproduced analog sound which the analog broadcast signal demodulator 13 has obtained by demodulating the analog broadcast signal, and the volume of the reproduced digital sound which the digital broadcast signal processing decoder 14 has obtained by decoding the digital broadcast signal according to the transition time by using the volume adjusting units 151 and 152 respectively, and mixes the analog sound and the digital sound into an audio signal by using the mixing unit 153 and then outputs the audio signal to the audio signal processing unit 16.

Referring again to FIG. 1, the operation unit 2 has a plurality of button switches mounted thereto, and serves as a user interface for transmitting a command showing, for example, a channel selection, sound volume control, or a change in the frequency characteristics to the control unit 3 through the user's operation.

The control unit 3 consists of, for example, a microcomputer, and has a function of determining the broadcast type of the digital terrestrial broadcast received by the broadcast reception and reproduction unit 1, and carrying out variable control of the transition time required to switch from the output of the analog sound to the output of the digital sound according to the determined broadcast type under control of a program.

Figure 3:
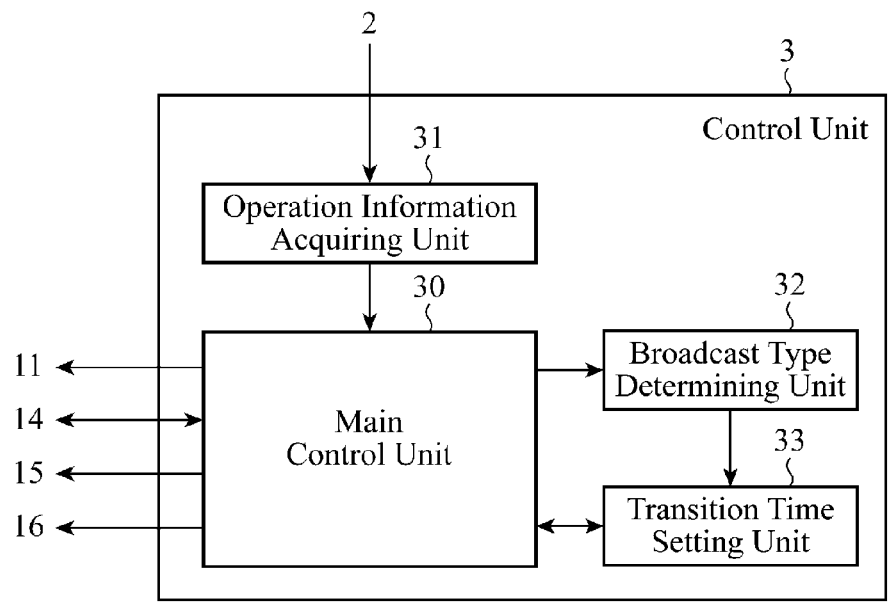
FIG. 3 is a block diagram showing the functionally deployed internal structure of a control unit of the radio broadcast receiver in accordance with Embodiment 1 of the present invention.

The program which the microcomputer reads and executes has a structure functionally deployed as shown in FIG. 3, and is comprised of a main control unit 30 as a control center thereof, and an operation information acquiring unit 31, a broadcast type determining unit 32, and a transition time setting unit 33.

In FIG. 3, in order to implement the function of working as the control unit 3 that determines the broadcast type of the digital terrestrial broadcast received by the broadcast reception and reproduction unit 1, and carries out variable control of the transition time required to switch from the output of the analog sound to the output of the digital sound according to the determined broadcast type, the main control unit 30 manages the sequence control of the operation unit 2, and the front end 11, the digital broadcast signal processing decoder 14, the audio signal mixer 15, and the audio signal processing unit 16 which construct the broadcast reception and reproduction unit 1.

The operation information acquiring unit 31 captures the user's instruction (a command showing a channel selection, a sound volume, a change in the frequency characteristics, or the like) which is inputted through the user's operation on the operation unit 2, and delivers the user's instruction to the main control unit 30.

The broadcast type determining unit 32 determines whether the received digital terrestrial broadcast is a hybrid broadcast or an all digital broadcast on the basis of status information (codec information and blend control information which will be mentioned below) which the main control unit 30 has acquired by communicating with the digital broadcast signal processing decoder 14 when the user performs a channel selection operation by using the operation unit 2, and sets an appropriate parameter (a transition time) to the transition time setting unit 33 according to the determination of whether the received digital terrestrial broadcast is a hybrid broadcast or an all digital broadcast under control of the main control unit 30.

When the broadcast type determining unit determines that the received digital terrestrial broadcast is an all digital broadcast according to the above-mentioned status information, the main control unit 30 outputs the shortest transition time which the digital broadcast signal processing decoder 14 can control to the audio signal mixer 15 via the transition time setting unit 33 to set the shortest transition time to the audio signal mixer. In contrast, when the broadcast type determining unit determines that the received digital terrestrial broadcast is a hybrid broadcast according to the status information and also determines that the received digital terrestrial broadcast is placed in a ball game mode in which a time lag occurs between the analog sound and the digital sound, the main control unit 30 outputs the shortest transition time which the digital broadcast signal processing decoder 14 can control to the audio signal mixer 15 via the transition time setting unit 33 to set the shortest transition time to the audio signal mixer. For example, the shortest time which the main control unit sets to the audio signal mixer is 1 ms.

Figure 4:
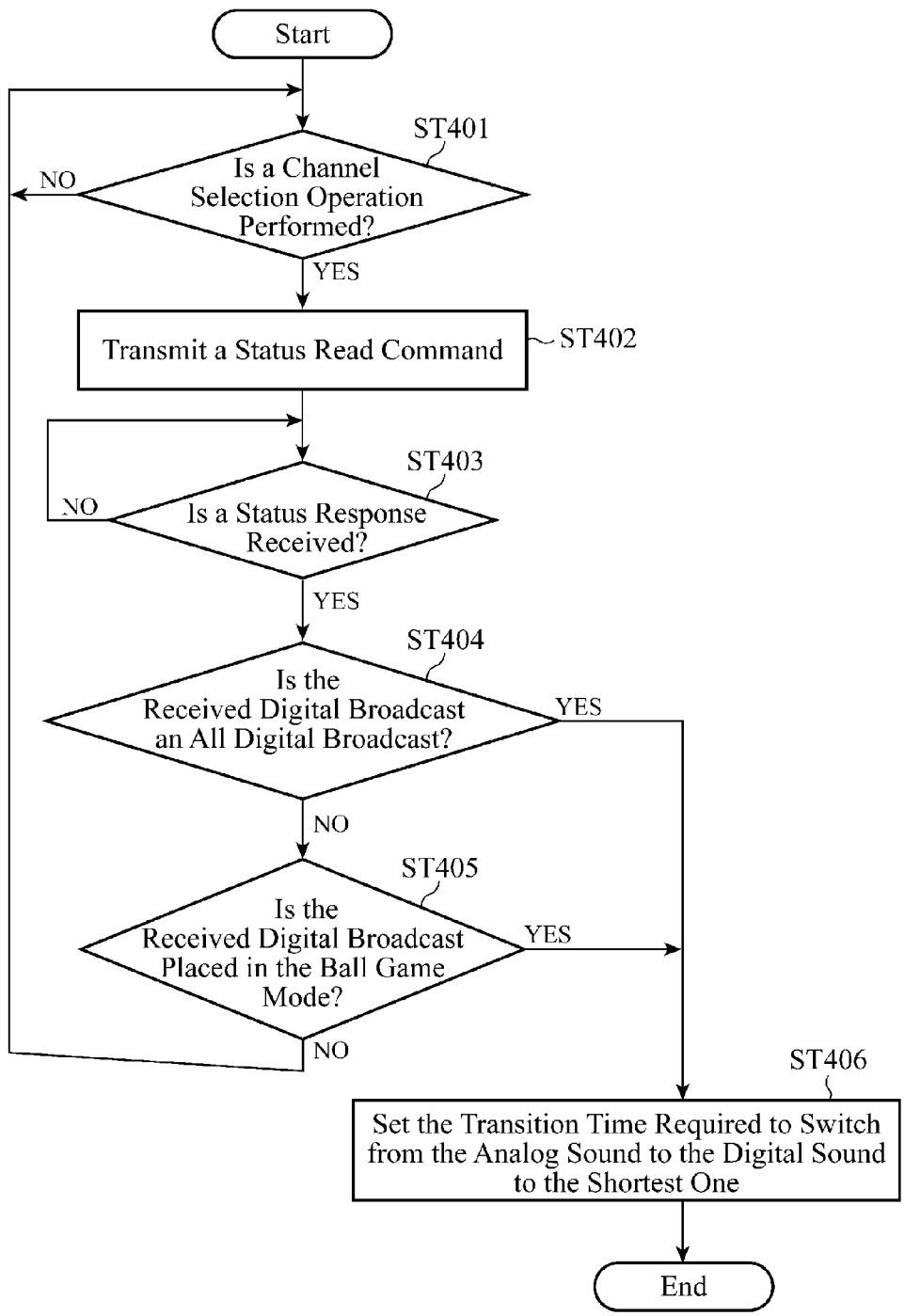
FIG. 4 is a flow chart showing the operation of the radio broadcast receiver in accordance with Embodiment 1 of the present invention.

FIG. 4 is a flowchart showing the operation of the radio broadcast receiver in accordance with Embodiment 1 of the present invention. Hereafter, the operation of the radio broadcast receiver will be explained, focusing on the operation of the main control unit 30 shown in FIG. 3.

Hereafter, the operation of the radio broadcast receiver in accordance with Embodiment 1 of the present invention shown in FIGS. 1 to 3 will be explained in detail with reference to the flow chart shown in FIG. 4.

In the flow chart of FIG. 4, when the user performs a channel selection operation by using the operation unit 2 first (if "YES" in step ST401), the operation information acquiring unit 31 of the control unit 3 captures information about this channel selection and then delivers this information to the main control unit 30 of the control unit 3.

The main control unit 30 communicates with the digital broadcast signal processing decoder 14 to transmit a status read command created to the digital broadcast signal processing decoder (step ST402), and waits for a status response from the digital broadcast signal processing decoder 14 (step ST403).

When receiving a status response from the digital broadcast signal processing decoder 14 (if "YES" in step ST403), the main control unit 30 delivers codec information and blend control information which are included in this response to the broadcast type determining unit 32.

The broadcast type determining unit 32 can determine whether the broadcast type of the broadcast currently being received is a hybrid broadcast or an all digital broadcast from this codec information, and delivers the result of the determination to the main control unit 30. Each of the above-mentioned codec information and the above-mentioned blend control information is included in the digital broadcast separated by the IF processing unit 12, and is furnished to the digital broadcast signal processing decoder 14.

In this case, when the broadcast type determining unit determines that the broadcast currently being received is an all digital broadcast (if "YES in step ST404), the main control unit 30 creates a parameter to set the transition time required to switch from the analog sound to the digital sound to the shortest one and sets the parameter to the transition time setting unit 33 (step ST406).

In contrast, when the broadcast type determining unit determines that the broadcast currently being received is a hybrid broadcast (if "NO" in step ST404), the broadcast type determining unit 32 further determines whether or not the broadcast currently being received is placed in the ball game mode in which a time lag occurs between the analog sound and the digital sound from the blend control information acquired from the status response (step ST405). In this case, when the broadcast type determining unit determines that the broadcast currently being received is placed in the ball game mode (if "YES" in step ST405), the main control unit 30 creates a parameter to set the transition time required to switch from the analog sound to the digital sound to the shortest one and sets the parameter to the transition time setting unit 33 (step ST406).

The parameter set to the transition time setting unit 33 is also transferred to the audio signal mixer 15 of the broadcast reception and reproduction unit 1 (the transition time control unit 154). When the transition time control unit 154 receives the above-mentioned parameter (the transition time varied and controlled by the control unit 3), the audio signal mixer 15 adjusts the volume of the reproduced analog sound which the analog broadcast signal demodulator 13 has obtained by demodulating the analog broadcast signal, and the volume of the reproduced digital sound which the digital broadcast signal processing decoder 14 has obtained by decoding the digital broadcast signal according to the transition time by using the volume adjusting units 151 and 152 respectively, and mixes the analog sound and the digital sound into an audio signal by using the mixing unit 153 and then outputs the audio signal to the audio signal processing unit 16.

The audio signal processing unit 16 performs processes including volume control and a frequency characteristic process on the audio signal of the selected and received program according to the user's instruction which is inputted through the user's operation on the operation unit 2.

In contrast, when the broadcast currently being received is not an all digital broadcast and the broadcast currently being received is not placed in the ball game mode (if "NO" in step ST405), the main control unit 30 returns to the process of step ST401 and waits for a channel selection operation by the user.

As previously explained, because in the radio broadcast receiver in accordance with Embodiment 1 of the present invention, the control unit 3 determines the broadcast type of the digital terrestrial broadcasting received by the broadcast reception and reproduction unit 1, and carries out variable control of the transition time required to switch from the output of the analog sound to the output of the digital sound (or switch from the output of the digital sound to the output of the analog sound) according to the determined broadcast type, the radio broadcast receiver can provide a comfortable receiving environment for the user without making the user feel bad also at the time of switching between the broadcast types. More specifically, the problem that noise mixes in the all digital broadcast, and, in the ball game mode, it becomes difficult for the audio signal to be heard during the transition time due to the time lag occurring between the analog sound and the digital sound can be solved.

Only an example in which the above-mentioned radio broadcast receiver in accordance with Embodiment 1 of the present invention receives an HD broadcast is shown above. However, the radio broadcast receiver in accordance with Embodiment 1 can be applied to not only an HD broadcast, but also all types of digital terrestrial broadcasting each of which broadcasts the same program in different broadcast formats, such as DAB (Digital Audio Broadcasting), ISDB-T (Integrated Service Digital Broadcasting-Terrestrial), and DAM (Digital Asset Management).

Furthermore, all of the structure of the control unit 3 shown in FIG. 3 can be implemented via software, or at least a part of the structure can be implemented via hardware.

For example, the data process of determining the broadcast type of the digital terrestrial broadcasting received by the broadcast reception and reproduction unit 1, and carrying out variable control of the transition time required to switch from the output of the analog sound to the output of the digital sound according to the determined broadcast type, which is carried out by the control unit 3, can be implemented via one or more programs running on a computer, or at least a part of the data process can be implemented via hardware.

Furthermore, the mixing unit 153 can be a switching means for switching between analog and digital, like a switch, which does not have any transient state at the time of setting of the shortest transition time.

INDUSTRIAL APPLICABILITY

As mentioned above, in order to provide a comfortable receiving environment for the user without making the user feel bad also at the time of switching between broadcast types by controlling the transition time according to the broadcast type of a received terrestrial digital radio broadcast including an HD radio broadcast, the radio broadcast receiver in accordance with the present invention is constructed in such a way as to include the broadcast reception and reproduction unit for outputting a digital sound when being able to receive a digital signal included in the terrestrial digital radio broadcast, and for outputting an analog sound when being unable to receive the above-mentioned digital signal, and the control unit for determining the broadcast type of the above-mentioned digital terrestrial broadcast received by the above-mentioned broadcast reception and reproduction unit to carry out variable control of the transition time required to switch from the output of the above-mentioned analog sound to the output of the digital sound according to the above-mentioned determined broadcast type. Therefore, the radio broadcast receiver in accordance with the present invention is suitable for use as a radio broadcast receiver which is used for reception of an HD radio broadcast which is a terrestrial digital radio broadcast based on an IBOC (In-Band On-Channel) method, and so on.

The invention claimed is:

1. A radio broadcast receiver comprising:
   a broadcast reception and reproduction unit configured to receive a terrestrial digital radio broadcast, output digital sound or analog sound signal using audio signals included in the received terrestrial digital radio broadcast, and perform a sound mixture process to mix analog sound and digital sound when switching the analog sound with the digital sound; and
   a control unit configured to determine whether the received terrestrial digital radio broadcast requires the sound mixture process, and allot a time period for performing the sound mixture process to the broadcast reception and reproduction unit in accordance with a result of the determination.

2. The radio broadcast receiver according to claim 1, wherein said terrestrial digital radio broadcast received by said broadcast reception and reproduction unit is a hybrid broadcast in which digital audio signals and analog audio signals are included, or an all-digital broadcast in which analog audio signals are not included whereas digital audio signals are included.

3. The radio broadcast receiver according to claim 1, wherein said broadcast reception and reproduction unit includes
   an analog broadcast signal demodulator configured to perform demodulation on the analog audio signals to generate said analog sound,
   a digital broadcast signal processing decoder configured to decode the digital audio signals to generate said digital sound, and
   an audio signal mixer configured to perform the sound mixture process by controlling a volume of the generated analog sound and a volume of the digital sound.

4. The radio broadcast receiver according to claim 3, wherein
   the digital broadcast signal processing decoder generates status information with respect to the digital audio signals, and
   said control unit determines whether the received terrestrial digital radio broadcast is the hybrid broadcast or the all-digital broadcast on a basis of the status information acquired from said digital broadcast signal processing decoder, and allots the time period of the sound mixture process on a basis of the determination.

5. The radio broadcast receiver according to claim 4, wherein when determining that the received digital terrestrial broadcast is the all-digital broadcast, said control unit allots a prescribed shortest time as the time period of the sound mixture process to said audio signal mixer.

6. The radio broadcast receiver according to claim 4, wherein when determining that the received digital terrestrial broadcast is the hybrid broadcast adopting a ball game mode in which a time lag between said analog sound and said digital sound is placed, said control unit allots a prescribed shortest time as the time period of the sound mixture process.

* * * * *